US009558357B2

(12) United States Patent
Bertin

(10) Patent No.: US 9,558,357 B2
(45) Date of Patent: Jan. 31, 2017

(54) DELEGATION OF ACCESS RIGHTS TO AN ACCOUNT AFTER THE DISAPPEARANCE OF THE USER

(71) Applicant: OBERTHUR TECHNOLOGIES, Colombes (FR)

(72) Inventor: Marc Bertin, Nanterre (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 13/946,606

(22) Filed: Jul. 19, 2013

(65) Prior Publication Data
US 2014/0026229 A1    Jan. 23, 2014

(30) Foreign Application Priority Data

Jul. 20, 2012    (FR) ...................................... 12 57081

(51) Int. Cl.
*G06F 21/60*    (2013.01)
*G06F 21/62*    (2013.01)

(52) U.S. Cl.
CPC ............. *G06F 21/60* (2013.01); *G06F 21/604* (2013.01); *G06F 21/6218* (2013.01)

(58) Field of Classification Search
CPC ........ G06F 21/32; G06F 21/50; G06F 21/604; G06F 21/62; G06F 21/60; G06F 21/6218
USPC .......................................................... 726/28
See application file for complete search history.

(56) References Cited

U.S. PATENT DOCUMENTS

| 8,504,653 B1* | 8/2013 | Commons et al. ........... 709/219 |
| 2005/0251851 A1 | 11/2005 | Patrick et al. |
| 2009/0172793 A1 | 7/2009 | Newstadt et al. |
| 2012/0016803 A1* | 1/2012 | Tharp .................... G06Q 10/10 705/319 |

FOREIGN PATENT DOCUMENTS

WO    2007/010427    1/2007

OTHER PUBLICATIONS

Ex. Mihail Alecu, Preliminary Search Report dated Mar. 14, 2013 for French Application No. 1257081 filed Jul. 20, 2012, pp. 1-2.

* cited by examiner

*Primary Examiner* — Hadi Armouche
*Assistant Examiner* — Angela Holmes
(74) *Attorney, Agent, or Firm* — MH2 Technology Law Group, LLP

(57) ABSTRACT

A management process for access to secure data includes: storing secure data associated with a first user and authentication data of said first user, managing access to the secure data of the first user, as a function of the authentication data of this first user. The process includes: storing, in the secure data of the first user, a heritage rule and a list of at least one second user and, for each second user of said list, an rule for access to secure data of the first user, storing authentication data for each second user of said list, and when the heritage rule is satisfied, managing access, by said at least one second user, to the secure data of the first user, as a function of the authentication data of the second user and of the rule for access of the second user.

10 Claims, 3 Drawing Sheets

DELEGATION OF ACCESS RIGHTS TO AN ACCOUNT AFTER THE DISAPPEARANCE OF THE USER

CROSS-REFERENCE TO RELATED APPLICATIONS

Figure 1:
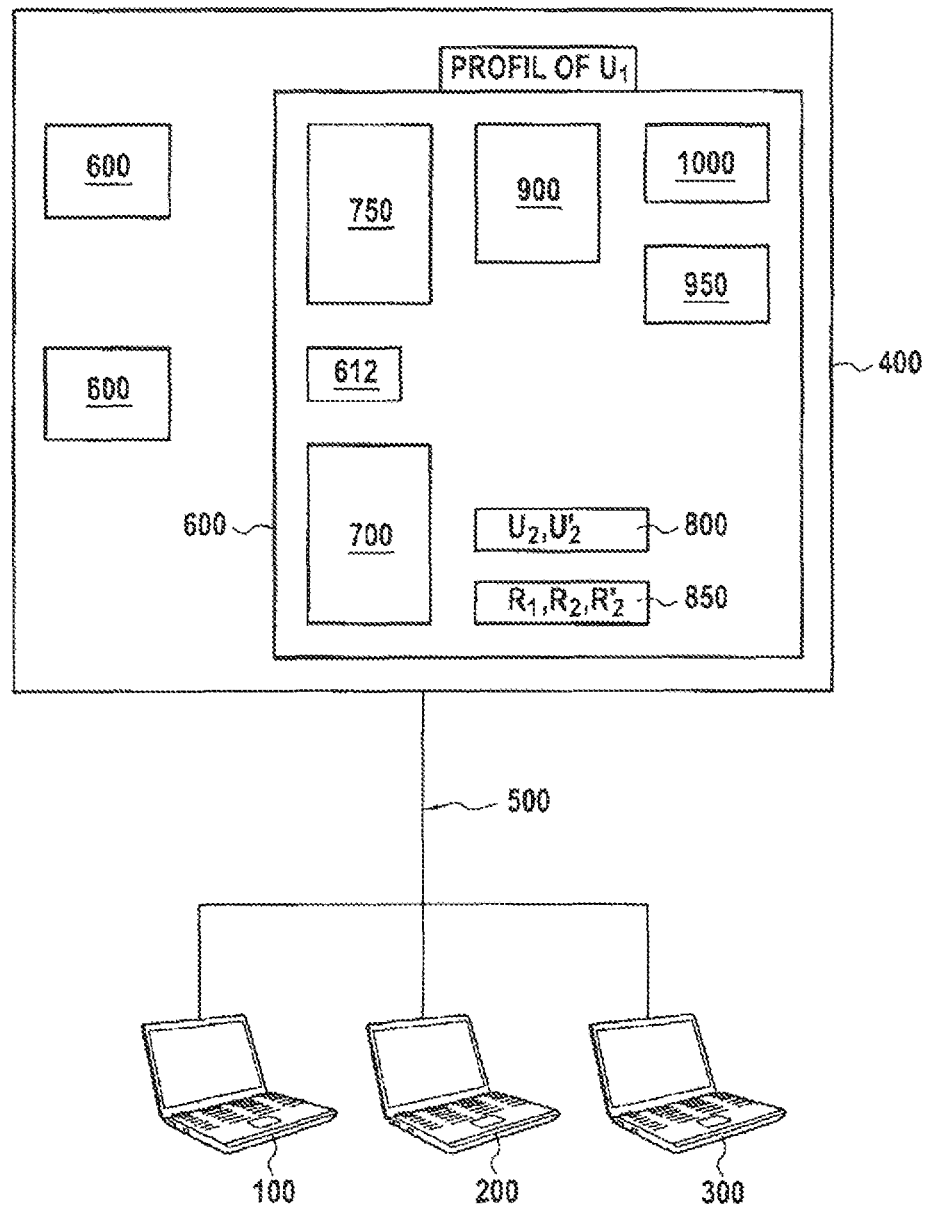

This application claims priority to French patent application 1257081 filed Jul. 20, 2012, the entire disclosure of which is hereby incorporated herein by reference in its entirety.

BACKGROUND OF THE INVENTION

The present invention relates to the field of management of access to secure data especially in the case of disappearance of the owner of these data.

Locasto (*Security and Privacy Considerations in Digital Death,* 2011) describes a solution for centralisation of data linked to a user on a specific server, the access conditions, to this server in case of disappearance of the owner of the data being transmitted to the provider or manager of this server.

And, document WO2007/10427 describes a solution aiming to favour the heritage of data of a disappeared user, the heritage being conditioned by a heritage licence and access to a death certificate.

However, according to the two solutions proposed for having access to the data of a user who might have disappeared, it is necessary to contact a third party (manager of the server for Locasto (2011), and notary or administration for supplying a death certificate in document WO2007/10427).

Several social networks, including Facebook, propose to close family of a disappeared user specifying that his account be transformed into a commemoration account.

However, the structure of the commemoration account is such that the data of the disappeared user are frozen. It is therefore not possible to administer or control them.

There is therefore a need to improve existing access management solutions to provide for each heir defined by the owner of the secure data personalised access to the data of the disappeared user, via an existing interface and without having to go through an intermediate.

SUBJECT MATTER AND SUMMARY OF THE INVENTION

The aim of the present invention is mainly to resolve the above drawbacks.

For this reason, the invention relates to a management process for access to secure data, executed by at least one management device for access, the process comprising:
- a storage step for secure data associated with a first user and his authentication data,
- a management step for access to the secure data of the first user, as function of his authentication data,
- a storage step, in the secure data of the first user, of a heritage rule, and a list of at least one second user and, for each second user of the list, a rule for access to secure data of the first user,
- a storage step of authentication data for each second user of the list, and
- when the heritage rule is satisfied, a management step for access by the at least one second user to the secure data of the first user as a function of the authentication data of the second user and of the rule for access of the second user.

In general, the existence of a heritage rule prevents second users from keeping a specific password for inheriting data of the first user.

The heritage rule can define a period during which it can be satisfied (ex: during holidays of the first user).

The heritage rule can define a condition verified only if a single heir is authenticated, or if each heir of a predetermined group is authenticated.

The heritage rule allows a second user to access the data of a first disappeared user without going through a third party.

In a particular embodiment of the invention, the process also comprises a storage step of a plurality of user profiles, each user profile including:
- secure data associated with the user, these secure data including:
  - personal data of the user,
  - a heritage rule,
  - a list of at least one other user, and
  - for each other user of the list, a rule for access, which defines a set of data among the secure data of the user to which the other user can have access, and
- authentication data of the user, in which the secure data of the first user are the secure data of the user profile of the first user and the authentication data of the second user are the authentication data of the user profile of the second user.

The advantage of this embodiment is that it allows a second user to access the data of a first disappeared user without having to go through another interface, where in effect the second user gains access via his normal profile.

The process can also comprise a receiving step of a heritage request of the first user, sent by the second user. The heritage rule of the first user is not satisfied if any heritage request of the first user has been received, the heritage rule able to be satisfied if at least one heritage request has been received.

This heritage request allows the first user to be warned of the tentative access to his secure data by a second user, and if the first user disappears, to satisfy a heritage condition to access the secure data of the disappeared user.

The heritage rule can be satisfied if for example at least two heritage requests have been received from two second different users.

Each user profile can also comprise a heritage indicator initialised at a first value, the process comprising a step for changing the heritage indicator of the first user to a second value during access, by the at least one second user, to the secure data of the first user, the process further comprising a sending step of an heir absence notification when, given the heritage indicator of the second user, the heritage rule of the first user cannot be satisfied.

The notification allows the first user to define a new heritage rule and/or select at least one new second user.

In another embodiment of the invention, the authentication data of the first user and the authentication data of the second user comprise at least one biometric datum.

The biometric sensor can for example be a digital footprint sensor, or even an iris analyser.

A management device for access in terms of the invention can be a portable terminal belonging to the first user and including a biometric data sensor.

The heritage rule can be based on motion capture (accelerometer, GPS) such that if the portable terminal does not move for a predetermined period, the heritage rule is satisfied.

The heritage can also be based on biometric data such as DNA for verifying the family tie between the first user and a second user.

In general, the invention can comprise a sending step of notification to the first user during access of the second user to the secure data of the first user.

This notification sending step allows the first user to be informed of the fact that a second user is attempting to access his secure data.

The heritage rule cannot be satisfied when the elapsed period from the most recent access, by the first user, to his, secure data is less than a predetermined period, and vice versa, the heritage rule can be satisfied when the elapsed period is greater than the predetermined period.

The heritage rule cannot be satisfied when an access number, by the first user, to his secure data during a predetermined period is greater than a predetermined threshold, and vice versa, the heritage rule can be satisfied when the access number is less than the predetermined threshold.

In a particular embodiment of the invention, the rule for access defines a set of secure data of the first user to which the second user can have access.

In this case, the rule for access allows the first user to personalise access to his data according to the second user. The list stored in the secure data of the first user can contain at least two second users, and at least two of these second users can have rule for access defining different sets.

As a variant, all the second users can have access to the same set of secure data of the first user.

The management step for access, by the at least one second user, to the secure data of the first user can comprise reading access management only.

Otherwise, the management step for access, by the at least one second user to the secure data of the first user can comprise management of both reading and writing access.

The rule for access of a second user can define a first set of data among the secure data of the first user to which the second user can have reading access only, and a second set of data among the secure data of the first user to which the second user can have reading and writing access.

The invention also relates to a management device for access to secure data, the device comprising:
storage means of secure data associated with a first user and his authentication data,
management means of access to secure data of the first user, as a function of his authentication data,
storage means, in the secure data of the first user, of a heritage rule, a list of at least one second user and, for each second user of the list, an access rule, the rule for access defining a set of data among the first secure data to which the second user can have access,
storage means of authentication data for each second user of the list, and
management means for access, by the at least one second user, to the secure data of the first user, as a function of the authentication data of the second user and of the rule for access of the second user, these management means for access being triggered when the heritage rule is verified.

In a particular embodiment of the invention, the management device for access can be a network server. In this case, the server can store the user profiles.

In another embodiment of the invention, the management device for access can be a portable terminal, for example a mobile phone or touch tablet.

The portable terminal can comprise a biometric sensor.

BRIEF DESCRIPTION OF THE DIAGRAMS

Figure 2:
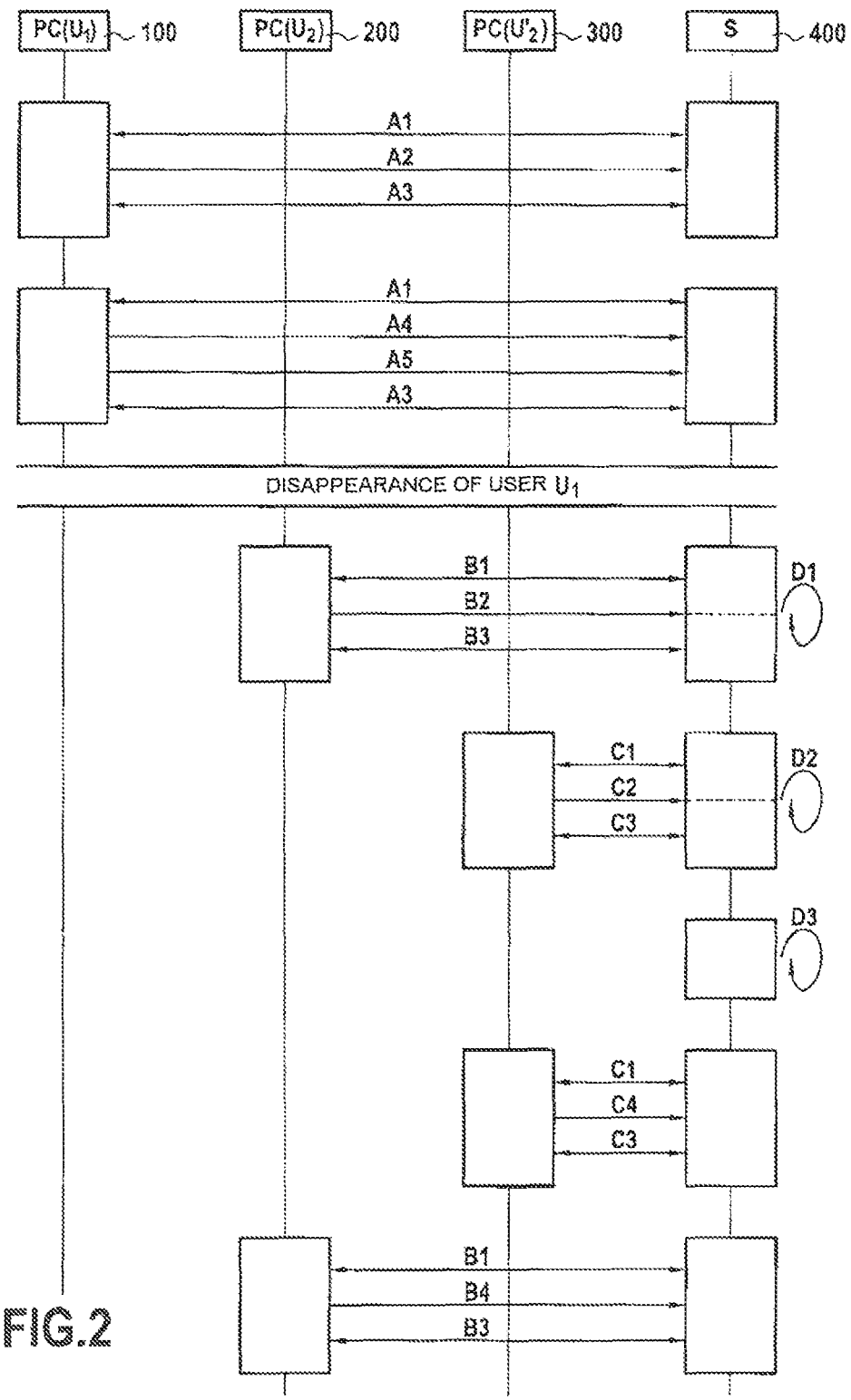
Figure 3:
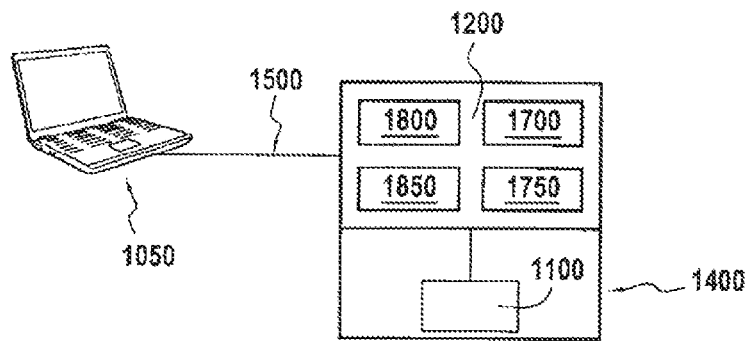
Figure 4:
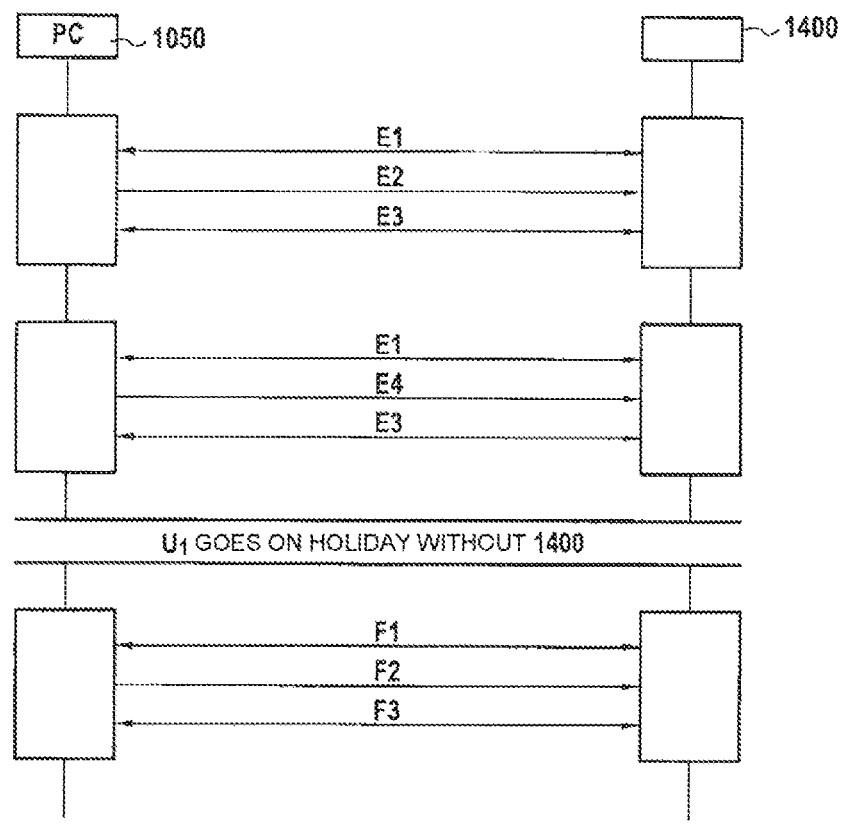

Other characteristics and advantages of the present invention will emerge from the following description in reference to the attached diagrams which illustrate an embodiment devoid of any limiting character, in which:

FIG. 1 schematically illustrates a server hosting a social network, according to a first embodiment of the invention, in its environment;

FIG. 2 illustrates in organigram form the main steps of a management process for access to secure data executed by the server of FIG. 1;

FIG. 3 schematically illustrates a terminal and a management device for access to secure data, according to a second embodiment;

FIG. 4 illustrates in organigram form the main steps of a management process for access to secure data executed by the management device for access to the secure data of FIG. 3.

DETAILED DESCRIPTION OF THE INVENTION

FIG. 1 shows, in its environment, a server 400 hosting an online service of social network type. The server 400 is an example of a management device for access to secure data according to an embodiment.

The server stores a plurality of profiles 600 corresponding to the users of the social network. Only three profiles 600 are shown in this figure but the server 400 can of course contain more.

The server 400 is connected by means of a telecommunications network 500 to several terminal 100, 200, 300 allowing users to access the online service. In this example, these terminals are computers.

Each profile 600 hosted on the server 400 corresponds to a user and especially comprises authentication data 700 of the user, personal data 750, a list of heirs 800, a set of rules 850 including a heritage rule and, for each heir of the list of heirs 800, an access rule, a list of contacts 900, a status indicator 610, an update space 950, and a list of donors 1000.

The authentication data 700 comprise for example an identifier and a password. The identifier and the password can be selected by the user as he logs on to the server 400 and creates his profile 600. The password can optionally be modified later.

The status indicator 610 is a variable which can take an <<active>> value and an <<inactive>> value. During creation of the profile of a user, the status indicator 610 is initialised at the <<in activity>> value.

The personal data 750 include for example personal information such as age, marital status, etc. of the user, photos, exchanged messages, . . . .

The list of contacts 900 is a list of other users of the social network, also having profiles 600, with which the user is in contact. The list of contacts 900 is especially used by the server 400 for generating the update space 950 as a function of events occurring in the profiles 600 of the contacts of a user.

The heir list 800 is a list of other users of the social network, also having profiles 600, which the user has designated as heirs so that they can execute some actions on his profile 600, in conditions defined by the set of rules 850.

In fact, in a normal use situation of the social network service by a user U1, the personal data 750, the list of heirs 800, the set of rules 850, the status indicator 610, and the list of donors 1000 of the profile 600 of user U1 constitute secure data of user U1, meaning that only user U1 can have reading and writing access, after being authenticated with of the server 400 with his authentication data 700. However, user U1 may want to give access to his secure data to one or more heirs, for example in the event of disappearance or absence of user U1.

Therefore, the heritage rule is a rule which defines the conditions to be complied with so that the server 400 gives access to the secure data of a user U1 to his or her heirs, and for each heir the access rules define to what extent the heir can access the secure data of user U1.

The heritage rule can for example define a period during which the server 400 gives access to the secure data of a user U1 to his or her heirs. For example, this period can correspond to the holidays of the first user U1.

The heritage rule can also define an authentication obligation of a single heir, or else of each of the heirs of a predetermined group.

As a variant, the heritage rule can define minimal connection frequency of the first user U1, below which the rule is verified. It can also be a condition on the elapsed period from the most recent connection of the first user U1.

These examples of heritage rule can be combined or used separately.

The rule for access can define a first set of data among the secure data of the first user U1 to which the second user can have access, or else access can refer to all the secure data of U1.

As a variant, all the second users can have access to the same set of secure data of U1.

As a variant, the rule for access can define a reading and/or writing access to the secure data of U1.

Finally, two users U2 and U2' can have rules for access relating to different sets and/or to reading access for U2 and reading writing access for U2'.

These examples of the access rule can be combined or used separately.

Finally, the donor list 1000 is a list, of other users of the social network, for which the user is an heir.

The operation of the server 400 will now be described, in reference to FIG. 2.

In FIG. 2, users U1, U2, U2' access the server 400 by means of terminal 100, 200, 300. The server 400 stores a plurality of profiles 600 of users, in particular those of users U1, U2 and U2'.

In this example, the terminals are computers, but they can also be portable terminals such as mobile phones, or touch tablets, etc.

A scenario for execution of the process according to an embodiment of the invention by the server 400 will now be described.

It is supposed that the first user U1 has already logged on to the server 400 and created his profile 600, but that initially his list of heirs 800 and his set of rules 850 are empty. The first user U1 wants to designate users U2 and U2' as heirs and define the corresponding rules.

So, the first user U1 is authenticated on the server 400 by using his authentication data 700 (step A1) via his computer 100 so as to access his profile 600. During a step A2, U1 designates users U2 and U2' as heirs and defines a heritage rule R1 as well as two access rules R2 and R2' respectively associated with users U2 and U2'. For example, user U1 selects users U2 and U2' from his list of contacts 900 to designate as heirs, and parameters models of predefined rules proposed by the server.

The server 400 then stores:
  users U2 and U2' in the list of heirs 800 of the profile 600 of user U1,
  the rules defined in the set of rules 850 of the profile 600 of user U1, and
  user U1 in the list of donors 1000 of profiles 600 of users U2 and U2'.

In this example, the rules are defined by U1 when he accesses his profile, as follows:
  the heritage rule R1 is defined such that it is satisfied when users U2 and U2' have both sent a heritage request;
  the rule for access R2 authorises reading and writing access to the set of secure data of user U1;
  the rule for access R2' authorises reading and writing access to a sub-set of secure data of U1 comprising only the status indicator 610.

Next, user U1 logs off (step A3) from his profile.

During another session, user U1 is authenticated (step A1) on the server 400 via his computer 100 then consults a profile during a step A4 and uploads a photo to his secure data during a step A5. He terminates the session by logging off during a step A3.

The two first sessions described to date relate to standard use of the social network service run by the server by user U1 via his computer 100.

Some time later, user U1 disappears. The following explanation is how users U2 and U2' designated by U1 prior to his disappearance can access the secure data of U1 without knowing the authentication data 700 of U1.

User U2 is authenticated (step B1) by using the authentication data 700 of his profile on the server 400 via his computer 200 to access his profile 600. To signal the disappearance of user U1, user U2 sends (step B2) a heritage request to the server 400. The server 400 notifies (step D1) user U1 of this request by sending an alert to the profile of user U1.

Beyond this example, the notification can also take other forms. For example, the server can send a message (SMS or email, for example) to the attention of user U1 to warn him immediately of the request, such that U1 does not have to log on to his profile to see the alert.

The server could also respond by asking U2' (or other second users) to send a heritage request so that the heritage rule is verified.

Next, user U2 terminates the session by logging off (step B3) from the server.

Similarly, user U2' is authenticated by using the authentication data 700 from his profile 600 on the server 400 during a step C1 via his computer 300, then sends the server a heritage request (step C2), the server 400 then sends a notification (step D2) to user U1 and U2' logs off in step C3.

The heritage rule R1 is satisfied. In fact, users U2 and U2' have both sent a heritage request.

Access by users U2 and U2' to the secure data of U1 is therefore opened during a step D3.

User U2' is authenticated with the authentication data 700 from his profile 600 during a step C1, then changes the status indicator 610 of the profile of user U1 from <<active>> to <<inactive>> during a step C1. This modification is accepted by the server 400 in terms of access rights offered by the rule R2'. User U2' then logs off during a step C3.

As a variant, the server 400 can automatically change the status indicator 610 of user U1 when the heritage rule R1 is satisfied.

User U2 is authenticated during a step B1, then sends a message to the contacts of user U1 during a step B4. This modification is accepted by the server 400 in terms of access rights offered by the rule R2. User U2 then logs off during a step B3.

In this scenario, the server 400 accepts or refuses the actions of the heirs on the secure data of the disappeared user U1. However, management by the server of a disappeared user profile can be done differently. For example, still with the social network example, the user profile in question can be modified so that it accepts no more new contacts.

The advantage of this first embodiment is that it allows users U2, U2' to access the data of a first user U1 who would have disappeared, without having to go through another interface, with access being made via their usual profiles, that is, by using their standard authentication data.

In an embodiment not shown, the online social network service can be run on a number of servers. For instance, the profiles of different users are stored distributed on different servers.

FIG. 3 illustrates a terminal 1050, and another terminal 1400, which is a management device for access to secure data according to an embodiment of the invention comprising a sensor 1100. These two terminals are connected by a cable 1500. The management device for access to secure data 1400 comprises a biometric sensor 1100, a memory 1200 containing authentication data 1700, personal data 1750, authentication data of heirs 1800, a set of rules 1850 including a heritage rule and, for each heir of the list of heirs 1800, a rule for access and a processor 1200 capable of managing the authentication from biometric sensor measurement 1100 and managing the various modifications of the secure data.

The terminal 1050 can be a computer or a mobile phone or a touch tablet or any other terminal known to the expert.

The device 1400 can be any sort of terminal comprising a sensor 1100, a memory 1200 and a processor 1200, as is the case in FIG. 3.

As a variant, the sensor 1100 can be on the terminal 1050.

The cable 1500 connecting the two terminals can be replaced by a telecommunications network, a wireless link or any other means for linking the two terminals.

As a variant, the process can be run on a single management device for access to secure data (1050+1400), for example a telephone with an integrated sensor.

In the following example the sensor is a footprint sensor, but it can also be an iris analyser or any other sensor for measuring a biological parameter.

The authentication data 1700 can contain a biometric characteristic measured by means of the sensor 1100. For example, it can be a footprint or an iris, according to the nature of the sensor.

The personal data 1750 can be of the same type as the personal data of the first embodiment and the authentication data of the heirs 1800 are the equivalent of the authentication data 800 stored in each user profile of the first embodiment explained in FIGS. 1 and 2.

The set 1850 of heritage rules and the access rule can be of the same type as in the first embodiment (set of rules 850), and in the event where the device 1400 is portable (mobile phone, tablet . . . ) the heritage rule can also be based on a motion capture (accelerometer, GPS) such that if the portable terminal does not move for a predetermined period, the heritage rule is satisfied.

FIG. 4 illustrates the terminal 1050 and the management device for access to the secure data 1400 of FIG. 3, using a process according to a second embodiment of the invention.

A scenario for executing the process according to this second embodiment of the invention by the management device for access to secure data 1400 of FIG. 3 will now be described.

A user U1 is authenticated (step E1) on the management device for access to secure data 1400 by placing his finger on the footprint digital sensor, then via the terminal 1050 he sends his emails (step E2) to the management device for access to secure data 1400 via a liaison 1500 which can be for example a USB cable or wireless technology such as Bluetooth, Wi-Fi, NFC, etc. He then logs off during a step E3. During another session, user U1 is authenticated (step E1) then requests a user U2 to place his finger on the sensor 1100 so that the management device for access to secure data 1400 can store the footprint in the memory 1200. User U1 then defines a heritage rule R1 and an access rule linked to user U2 In this example the heritage rule R1 is satisfied when user U2 is authenticated and the date of this authentication corresponds to the holiday dates of U1, and the rule for access R2 allows user U2 to reading access to the secure data of user U1. User U1 logs off (step E3).

Some time later, user U1 GOES ON HOLIDAY and leaves the management device for access to secure data 1400 to user U2.

When on holiday, U1 needs information contained in one of the emails saved in his secure data on the management device for access to secure data 1400.

To supply him with this information, user U2 will be authenticated (step F1) via the biometric sensor 1100 by placing his finger on it. Once the management device for access to secure data 1400 has recognised his footprint, user U2 tries to access data via the computer 1050. In keeping with the access rule defined earner by user U1, user U2 can have reading access (step F2) to the secure data of U1. He can then give the requested information to U1 then log off dueing step F3.

The main advantage of this second embodiment of the invention is that the second users do not have to retain a password as the authentication data are intrinsic to their body.

As a variant, the authentication of users would have been able to be done via entering of a PIN code.

Beyond this example, the case where user U1 disappears is also covered by the invention.

The invention claimed is:

1. A management process for accessing secure data comprising:
   securing, by at least one access management device, data associated with a first user and authentication data of said first user;
   accessing, by the least one access management device, the secure data of the first user, as a function of the authentication data of this first user,
   storing, by the least one access management device, in association with the secure data of the first user:
      a heritage rule defining conditions for giving heirs of the first user access the secure data of the first user, and
      a list of at least one second user designating the heirs of the first user, and
      for each second user of said list, a rule for giving access to the secure data of the first user;
   storing, by the least one access management device, authentication data for each second user of said list;

determining, by the least one access management device, whether the heritage rule is satisfied; and accessing by the at least one second user, when the heritage rule is satisfied, the secure data of the first user as a function of the authentication data of the at least one second user and of the respective rule for giving access to the secure data of the first user, wherein:

said heritage rule is not satisfied when the elapsed period from the most recent access, by the first user, to the secure data of the first user is less than a predetermined period, and said heritage rule is able to be satisfied when said elapsed period is greater than said predetermined period, or said rule heritage rule is not satisfied when an access number, by the first user, to the secure data of the first user during a predetermined period is greater than a predetermined threshold, and said heritage rule being satisfied when said access number is less than said predetermined threshold, or said heritage rule is satisfied when at least two heritage requests have been received from two different second users; and wherein each of the rules for giving access to the secure data of the first user defines a set of the secure data of the first user to which the at least one second user can access in reading and/or writing.

2. The process of claim 1, further comprising storing a plurality of user profiles, each user profile including:

secure data associated with the user, said secure data including:
personal data of the user,
a heritage rule,
a list of at least one other user, and
for each other user of said list, a rule for access to secure data of the first user, and
authentication data of the user, in which said secure data of the first user are the secure data of the user profile of the first user, and said authentication data of the second user are the authentication data of the user profile of the second user.

3. The process of claim 2, in which each user profile comprises a heritage indicator initialized to a first value, the process comprising a step for changing the heritage indicator of the first user to a second value during access, by said at least one second user, to the secure data of the first user, said process further comprising a sending step of heir absence notification when, given the heritage indicator of said at least one second user the heritage rule of the first user cannot be satisfied.

4. The process of claim 1, wherein said authentication data of the first user and said authentication data of the second user comprise at least one biometric datum.

5. The process of claim 1, wherein said at least one management device for access is a portable terminal of the first user including a biometric data sensor.

6. The process of claim 1, comprising a notification-sending step to the first user during access of the second user to the secure data of the first user.

7. The process of claim 1, wherein said list stored in the secure data of the first user contains at least two second users, and at least two of said second users have rules for access defining different sets.

8. The process of claim 1, in which the accessing by the at least one second user, to the secure data of the first user, comprises management of reading/writing access.

9. The process of claim 6, in which each of the rules for giving access to the secure data of the first user defines a second set of data among the secure data of the first user to which the second user can have access in reading.

10. A device for managing access to secure data, comprising:

storage means for storing secure data associated with a first user and authentication data of said first user;

management means for accessing the secure data of the first user, as a function of the authentication data of this first user;

storage means for storing in association with the secure data of the first user:
a heritage rule defining conditions for giving heirs of the first user access the secure data of the first user,
a list of at least one second user designating the heirs of the first user, and
for each second user of said list, a rule for giving access to the secure data of the first user;

storage means for storing authenticating data for each second user of said list; and management means for accessing, by said at least one second user, the secure data of the first user, as a function of the authentication data of the at least one second user and of the respective rule for giving access to the secure data of the first user based on a determination that the heritage rule is satisfied, wherein:

said heritage rule is not satisfied when the elapsed period from the most recent access, by the first user, to the secure data of the first user is less than a predetermined period, and said heritage rule is able to be satisfied when said elapsed period is greater than said predetermined period, or said rule heritage rule is not satisfied when an access number, by the first user, to the secure data of the first user during a predetermined period is greater than a predetermined threshold, and said heritage rule being satisfied when said access number is less than said predetermined threshold, or said heritage rule is satisfied when at least two heritage requests have been received from two different second different users; and wherein each of the rules for giving access to the secure data of the first user defines a set of secure data of the first user to which the second user can access in reading and/or writing.

\* \* \* \* \*